US010433190B2

(12) United States Patent
Wegmann et al.

(10) Patent No.: US 10,433,190 B2
(45) Date of Patent: Oct. 1, 2019

(54) SIGNALING PHYSICAL CELL IDENTIFIER PROBLEMS

(71) Applicant: Nokia Solutions and Networks Oy, Espoo (FI)

(72) Inventors: Bernhard Wegmann, Holzkirchen (DE); Ingo Viering, Munich (DE); Henrik Martikainen, Jyvaskyla (FI); Andreas Lobinger, Grafing (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/500,558

(22) PCT Filed: Aug. 5, 2014

(86) PCT No.: PCT/EP2014/066787
§ 371 (c)(1),
(2) Date: Jan. 31, 2017

(87) PCT Pub. No.: WO2016/019977
PCT Pub. Date: Feb. 11, 2016

(65) Prior Publication Data
US 2017/0223557 A1    Aug. 3, 2017

(51) Int. Cl.
*H04W 24/02* (2009.01)
*H04W 24/04* (2009.01)
*H04W 36/00* (2009.01)

(52) U.S. Cl.
CPC ........... *H04W 24/02* (2013.01); *H04W 24/04* (2013.01); *H04W 36/0083* (2013.01)

(58) Field of Classification Search
CPC .................. H04W 84/045; H04W 92/20
(Continued)

(56) References Cited

U.S. PATENT DOCUMENTS

2010/0008235 A1\* 1/2010 Tinnakornsrisuphap ..................
H04L 29/12264
370/241
2010/0178912 A1    7/2010 Gunnarsson et al. ........ 455/423
(Continued)

FOREIGN PATENT DOCUMENTS

EP    2 271 142 A1    1/2011
EP    2 605 589 A1    6/2013

OTHER PUBLICATIONS

3GPP TS 36.331 V12.2.0 (Jun. 2014), "$3^{rd}$ Generation Partnership Project; Technical Specification Group Radio Access Network; Evolved Universal Terrestrial Radio Access (E-UTRA); Radio resource Control (RRC): Protocol specification (Release 12)", 365 pgs.

(Continued)

*Primary Examiner* — Kiet M Doan
(74) *Attorney, Agent, or Firm* — Harrington & Smith

(57) ABSTRACT

The present invention provides apparatuses, methods, computer programs, computer program products and computer-readable media regarding signaling physical cell identifier problems. Certain aspects of the present invention include receiving, at a network node, information regarding a suspected identifier problem from a first base station, the information indicating the suspected identifier problem between the first base station and a second base station, and analyzing the suspected identifier problem based on the received information.

20 Claims, 5 Drawing Sheets

(58) Field of Classification Search
USPC ..... 455/418, 435.1, 450, 433, 436; 370/328, 370/252, 337, 225, 329, 241
See application file for complete search history.

(56) References Cited

U.S. PATENT DOCUMENTS

| | | | | |
|---|---|---|---|---|
| 2012/0275394 | A1* | 11/2012 | Gunnarsson | H04W 28/04 370/329 |
| 2012/0315935 | A1* | 12/2012 | Wang Helmersson | H04W 16/18 455/501 |
| 2013/0150056 | A1* | 6/2013 | Yi | H04W 36/04 455/444 |
| 2013/0337794 | A1 | 12/2013 | Kojima | 455/418 |
| 2014/0071891 | A1* | 3/2014 | Zhou | H04J 11/0069 370/328 |
| 2014/0094210 | A1* | 4/2014 | Gellens | H04W 4/12 455/517 |
| 2014/0099955 | A1* | 4/2014 | Nukala | H04W 36/00 455/436 |
| 2014/0370875 | A1* | 12/2014 | Gupta | H04W 8/26 455/418 |
| 2015/0156782 | A1* | 6/2015 | Manssour | H04J 11/0056 455/452.1 |

OTHER PUBLICATIONS

3GPP TS 36.413 V12.2.0 (Jun. 2014), "3$^{rd}$ Generation Partnership Project; Technical Specification Group Radio Access Network; Evolved Universal Terrestrial Radio Access Network (E-UTRAN); S1 Application Protocol (S1AP) (Release 12)", 285 pgs.

3GPP TS 36.423 V12.2.0 (Jun. 2014), "3$^{rd}$ Generation Partnership Project; Technical Specification Group Radio Access Network; Evolved Universal Terrestrial Radio Access Network (E-UTRAN); X2 application protocol (X2AP) (Release 12)", 151 pgs.

\* cited by examiner

SIGNALING PHYSICAL CELL IDENTIFIER PROBLEMS

FIELD OF THE INVENTION

The present invention relates to apparatuses, methods, systems, computer programs, computer program products and computer-readable media regarding signaling Physical Cell Identifier (PCI) problems.

BACKGROUND OF THE INVENTION

Cell identifiers typically have 2 contradicting targets. On the one hand, they have to be short in order to ease the detection for the terminal. It is noted that in most cases the cell identifiers are coded into the reference (pilot) signals which are used for cell detection. So they have to be read without knowing anything from a cell, without being able to estimate the channel, and without having synchronization to a cell. This makes the PCI detection a rather complex hypothesis test. Thus, the smaller the set of PCIs (=codes), the easier and faster the detection means.

On the other hand, they must be unique in a local neighborhood. A large set of PCIs (i.e. long identifiers) are needed to provide uniqueness for a sufficiently large area.

In the following, the latter requirement (unique in a local neighborhood, will be discussed in more detail. It implies 2 conditions:

First, it is obvious that adjacent neighboring cells must have different PCIs, otherwise they cannot be distinguished. Violation of this condition is called PCI collision.

FIG. 1 illustrates an example of the problem. "ECGI" (enhanced cell global identifier) is the LTE (Long Term Evolution) terminology for a global (i.e. unique) cell identifier, which is unique but unfortunately also too long for cell detection by simple decorrelation means on UE side. The terminal moving from ECGI1 towards ECGI3 both with identical PCI codes will interpret the reference signals (RS) of ECGI3 as an echo or multi-path component of the RS of the current serving ECGI1, i.e. it would not even realize that there is another cell (details are below). At some point it will drown in the interference of ECGI3 and therefore will suffer a failure (radio link failure).

Secondly, neighbors of neighbors must also have different PCIs, which is however less obvious. Violation of this condition is called PCI confusion.

FIG. 2 illustrates an example of the resulting problem, where the two cells ECGI1 and ECGI3 have the same PCI1. The UE goes from cell ECGI2 to ECGI3 and reports a measurement event that PCI1 is stronger than serving PCI2. The serving cell ECGI2 owns a neighbor relation with ECGI1 having the same PCI1 and initiates the handover preparation towards ECGI1 which will obviously result in a failure.

However, in reality it is not obvious at all which cells have a neighbor relation. In networks with a very dense deployment a single cell may have more than 50 neighbors. This is a result of unexpected propagation such as coverage overshots of far distant cells. So the expression "neighbor relation" has a more abstract meaning, far beyond a pure geographical meaning.

Finally, it is important to mention that a single cell (e.g. ECGI2) can only have cells on the neighbor relation table (NRT) which are uniquely identifiable, i.e. all PCIs within the NRT are different from ECGI2 and mutually different from each other. The problem is that also the ANR (Automatic Neighbor Relation) function is not able to detect neighbors having the same PCI as another neighbor. As seen in the upper simple example illustrated in FIG. 2, if there is a neighbor relation between ECGI1 and ECGI2, and the terminal would report PCI1, the serving cell ECGI2 must interpret it as ECGI1 which is listed in NRT.

Similar in the case of collision: Since PCI is expressed by the reference signals, the terminal must interpret the identical reference signal from ECGI3 as an echo of the RS of ECGI1. If the cells are synchronized and the signals are received within the cyclic prefix, the terminal would measure the sum of both signal strengths. If the ECGI3 reference signal is received outside the cyclic prefix, the terminal would experience it as interference. In any case, the UE will not be able to detect that there is another cell and thus would not even send a measurement report.

Thus, PCI collision and confusion are very hidden problems. They lead to connection failures (radio link failures/handover failures), and the root cause is very difficult (or impossible) to detect.

For the ANR (automatic neighbor relation) feature, the 3GPP specification has defined a feature where the serving cell can instruct a terminal to read the ECGI of an already reported neighbor. This allows the base station to set up a missing neighbor relation, in case an unknown PCI is reported. However, in the case of the two above discussed problems, where either no PCI is reported at all (collision) or a well-known PCI is reported (confusion), i.e. ANR is not suitable. Irrespective of limited capability, the ANR feature is rather complex for the terminal, and it takes quite some time (since the terminal needs to synchronize to the new cell, read the system information and then return back to the serving cell to report it). It is unlikely that the terminal has stable channel to both cells for such a long time.

Another approach to tackle PCI conflict issues is exploiting failure statistics from OAM perspective (Operation and Maintenance). If there are for a considerable long period unusually many failures where no obvious root cause is found, one could derive that there might be a PCI problem. However, this will have some limited confidence, and it will take quite some time to detect it.

SUMMARY OF THE INVENTION

It is therefore an object of the present invention to overcome the above mentioned problems and to provide apparatuses, methods, systems, computer programs, computer program products and computer-readable media regarding signaling PCI Problems via X2, S1 or Itf-N.

According to an aspect of the present invention there is provided a method comprising:
  receiving, at a network node, information regarding a suspected identifier problem from a first base station, the information indicating the suspected identifier problem between the first base station and a second base station,
  analyzing the suspected identifier problem based on the received information.

According to another aspect of the present invention, there is provided an apparatus for use in a network element, comprising:
  at least one processor,
  and
  at least one memory for storing instructions to be executed by the processor, wherein
  the at least one memory and the instructions are configured to, with the at least one processor, cause the apparatus at least to perform:

receiving information regarding a suspected identifier problem from a first base station, the information indicating the suspected identifier problem between the first base station and a second base station, analyzing the suspected identifier problem based on the received information.

According to another aspect of the present invention there is provided an apparatus comprising:

means for receiving information regarding a suspected identifier problem from a first base station, the information indicating the suspected identifier problem between the first base station and a second base station, means for analyzing the suspected identifier problem based on the received information.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
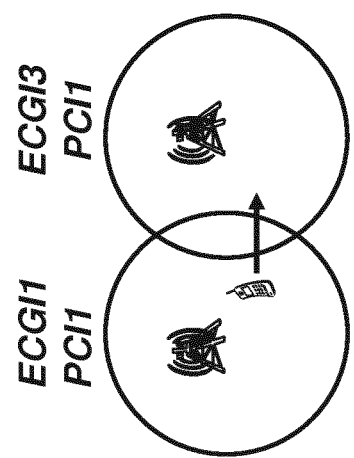
FIG. 1 is a diagram illustrating an example of PCI collision to which certain aspects of the present invention are applicable.

In the following, some example versions of the disclosure and embodiments of the present invention are described with reference to the drawings. For illustrating the present invention, the examples and embodiments will be described in connection with a cellular communication network based on a 3GPP based communication system, for example a GSM, UMTS or LTE/LTE-A based system. However, it is to be noted that the present invention is not limited to an application using such type of communication system or communication network, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to certain aspects of the present invention, there are provided solutions for solving problems with non-unique cell identifiers such as a "Physical Cell Identifier" (PCI).

According to certain aspects of the present invention, the following is proposed:

First, it is proposed to carefully analyze already available information on failures such as RLF (radio link failure) Report or RRC (radio resource control) connection re-establishment request (RER). Based on this information the base station can generate "suspicions" for a PCI problem. It is noted that such a suspicion can not contain the full information needed to resolve the problem. Furthermore, it is not clear whether its reliability is sufficient.

Then, it is proposed to exchange this suspicion with a neighboring base station using the S1 or X2 interface. This can create the full picture of the PCI problem and increase the reliability significantly.

Alternatively, it is proposed to count the suspicions and send them to OAM (operation and maintenance). Based on those counters from different cells in a certain neighborhood, OAM should be able to increase the reliability of PCI suspicions and potentially create the full picture as well.

Figure 2:
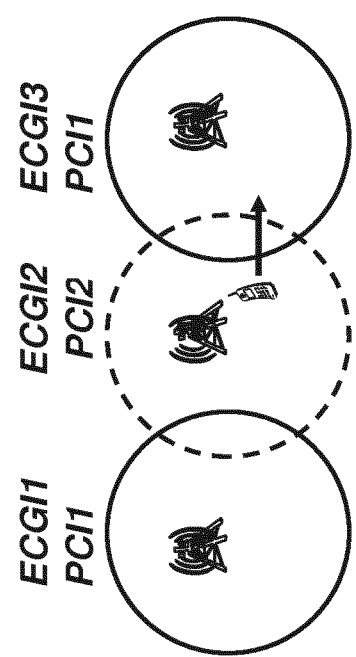
FIG. 2 is a diagram illustrating an example of PCI confusion to which certain aspects of the present invention are applicable.

Regarding the creation of suspicions by RLF Report and RER, reference is made to the information provided with RER and RLF report for failure caused by PCI confusion as exemplarily shown in FIG. 2. It is assumed that ECGI1 is in the NRT of ECGI2. By definition, ECGI3 cannot be in the NRT of ECGI2 in this case (otherwise the PCI confusion would be obvious).

In the following, according to certain embodiments of the present invention, a possible sequence of actions/events related to mobility process is described. However, it is noted that the invention is not limited to this sequence of actions/events and that there are many other options which are omitted here for the sake of clarity. Thus, the following sequence only serves as an illustrative example.

Thus, according to the example of certain aspects of the present invention,

UE reports measurements from neighbor PCI1 to the serving cell ECGI2 (assume UE has C-RNTI2). Note that the measurements include the PCI1.

ECGI2 sends HO preparation message to ECGI1 (since it is the cell in its NRT related to PCI1). ECGI1 makes preparations for the expected UE and reserves/assigns already the temporary identifier C-RNTI1 for UE which is also sent back to ECGI2.

ECGI2 sends handover command to UE with the instruction to go to PCI1 (but with all relevant information from ECGI1, in particular dedicated preamble)

UE will sync and send RACH (Random Access Channel) to PCI1 (which is ECGI3)

Most likely the RACH will not be successful and the UE will detect a handover failure (HoF)

After HoF the UE will send a re-establishment request (RER) to ECGI3 which cannot be successful (since ECGI3 does not have the UE context for C-RNTI1)

The UE will go to idle and re-connect to ECGI3.

The UE will send a RLF Report to ECGI3.

The eNB serving ECGI3 is now able to analyze a RER and an RLF Report. According to the specifications (cf. 3GPP TS 36.331) the content will be as follows:

| Re-establishment Request | RLF Report |
| --- | --- |
| C-RNTI (radio network temporary identifier): C-RNTI2 from ECGI2 physCellId: source cell PCI: PCI2 shortMAC-I: . . . reestablishmentCause: handoverFailure | plmn-IdentityList, RSRP&RSRQ measurements, location & velocity failedPCellId: ECGI3 if available or PCI1 if not previousPCellId from RRCConnectionReconfiguration: ECGI2 timeConnFailure: time since "HO command" to HoF: short connectionFailureType: HoF c-RNTI to the C-RNTI used in the source PCell: C-RNTI2 from ECGI2 reestablishmentCellId: ECGI3 |

Thus, eNB serving the cell ECGI3 can make the following considerations (it is noted that this is only an example, maybe those considerations can even be made more reliable, or vice versa, not all aspects have to be considered):

The RLF Report indicates that there was a "handover failure" from ECGI2 ("previous") to PCI1 or ECGI3 ("failed"). In both cases ECGI3 has to assume that ECGI2 has initiated a handover towards itself (at least if the timeConnFailure is short).

However, in case of handover problem, ECGI3 would have been prepared, i.e. it would have a UE context which fits to the RLF Report. This is not the case, since the context went to ECGI1.

ECGI2 is not even neighbor of ECGI3 (it is noted that initially it has been assumed that ECGI3 is NOT in the NRT of ECGI2, however this does not exclude that ECGI2 is in the NRT of ECGI3 since neighbor relations are not necessarily bi-directional. But it is believed it is likely that there is no neighbor relation in both directions)

The RER contains as source cell PCI2 which is not a neighbor (see above)

This failure signature suggests that there is a PCI confusion of ECGI2 with an unknown partner, and the "bridge" (creating the confusion) is ECGI2. So cell ECGI3 can count this "suspicion" as a "suspected PCI confusion towards bridge ECGI2".

Send Suspicions to OAM (Centralized)

This counter can be forwarded to OAM via Itf-S (southbound) or Itf-N (northbound). OAM has good chances to create the full picture and therefore to resolve the PCI confusion:

It checks, if possible, the NRT in ECGI2 to look for the same PCI (=PCI1) as ECGI3. This will lead to ECGI1.

Figure 3:
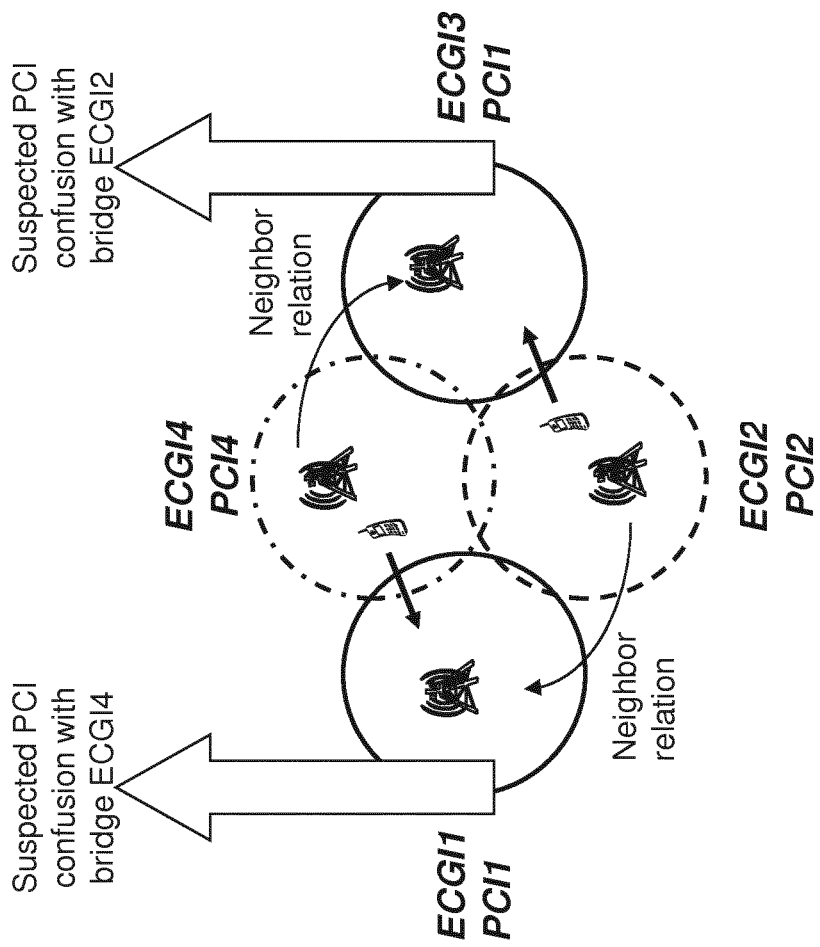
FIG. 3 is a diagram illustrating reporting suspicions towards an OAM according to certain aspects of the present invention.

Alternatively, or in addition, OAM can collect the suspicions of all cells. It is likely that it also receives suspicions from ECGI1 with suspected PCI confusion towards another bridge (not ECGI2), cf. FIG. 3, in a similar manner as described above.

If it receives too many suspicions from ECGI3, it could initiate a PCI change in ECGI3 without having the full picture of the PCI confusion.

Exchange Suspicions via X2/S1 (Distributed)

Another possibility would be to send a message to ECGI2 about this suspicion. It is noted that ECGI2 is the only cell which can uniquely create the full picture of the PCI confusion. This may be the faster and more reliable method compared with the OAM solution. ECGI2 would be aware of neighbor ECGI1, and it would receive the suspicion from ECGI3.

One problem is that there might be no X2 interface between ECGI3 and ECGI2 to carry such a message. Note that there could be, even though we have assumed that ECGI3 is not in the NRT of ECGI2. So there are the following options:

1. This message can be defined via S1 interface.
2. It can be assumed that the ECGI3, in case that there is no X2 interface, uses an X2 setup and sends the message via the new X2 interface.
3. The message could be defined only via X2. PCI confusion in cases without X2 interface would not be detected then. However, it is noted that such a feature would still be helpful.

The messages could also use an existing message (with a special configuration of the existing fields) such as RLF indication via X2
HO Report via X2
RLF indication/HO Report via S1 (both are currently not defined via S1, but under discussion)

In the foregoing, certain aspects of the present invention have been explained with respect to PCI confusion. However, it is noted that the present invention also covers PCI collision cases. Thus, the present invention applies in a similar manner also to PCI collision cases.

In the following, a more general description of certain embodiments of the present invention is made with respect to FIGS. 4 and 5.

Figure 4:
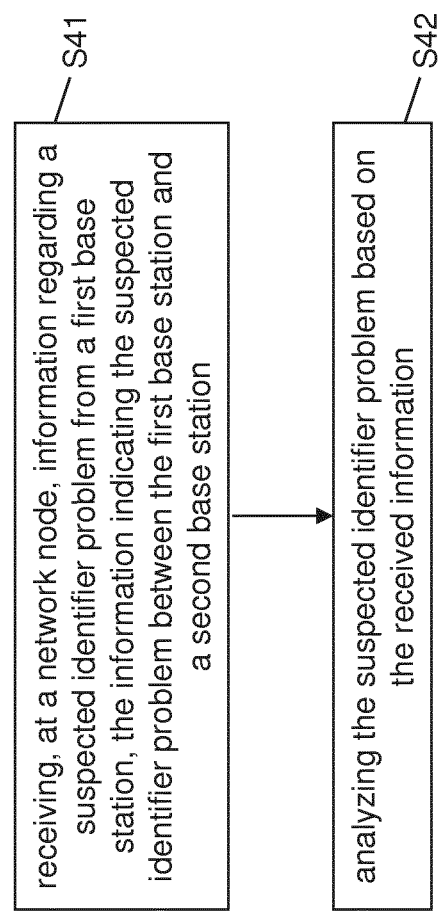
FIG. 4 is a diagram illustrating an example of a method according to certain aspects of the present invention.

FIG. 4 is a flowchart illustrating an example of a method according to example versions of the present invention.

According to example versions of the present invention, the method may be implemented in a network element or the like. The method comprises receiving, at a network node, information regarding a suspected identifier problem from a first base station in a step S41, the information indicating the suspected identifier problem between the first base station and a second base station, and analyzing the suspected identifier problem based on the received information in a step S42.

According to further example version of the present invention, the network node is a network management entity located in the operation and maintenance domain and the method further comprises collecting additional information on suspected identifier problems from multiple other base stations, and analyzing the suspected identifier problem based on the additional information.

According to further example version of the present invention, the network node is a network management entity located in the operation and maintenance domain and the method further comprises analyzing the suspected identifier problem based on a neighbor relation table associated with the second base station.

According to further example version of the present invention, the network node is the second base station and the method further comprises analyzing the suspected identifier problem based on a neighbor relation table stored in the second base station.

According to further example version of the present invention, the method further comprises receiving the information at the first base station via a X2 interface from the second base station.

According to further example version of the present invention, the method further comprises receiving the information at the first base station via a S1 interface.

According to further example version of the present invention, the information is sent in a radio link failure indication message or a handover report message.

According to further example version of the present invention, the method further comprises initiating, at the network node, appropriate actions in order to resolve the identifier problem.

According to further example version of the present invention, the information regarding a suspected identifier problem is created at the second base station based on evaluating existing information in the second base station based on radio link failure report and/or re-establishment request.

According to further example version of the present invention, the identifier problem is a physical cell identifier confusion or a physical cell identifier collision.

Figure 5:
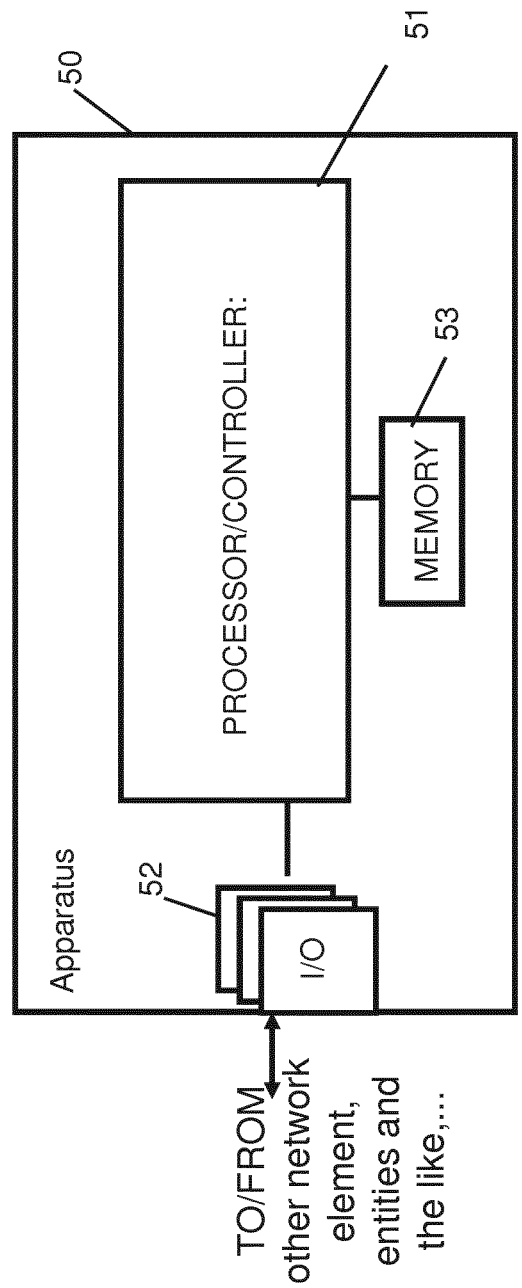
FIG. 5 is a diagram illustrating an example of an apparatus according to certain aspects of the present invention.

FIG. 5 is a block diagram showing an example of an apparatus according to example versions of the present invention.

In FIG. 5, a block circuit diagram illustrating a configuration of an apparatus 50 is shown, which is configured to implement the above described aspects of the invention. It is to be noted that the apparatus 50 shown in FIG. 5 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 50 may comprise a processing function or processor 51, such as a CPU or the like, which executes instructions given by programs or the like. The processor 51 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 52 denotes transceiver or input/output (I/O) units (interfaces) connected to the processor 51. The I/O units 52 may be used for communicating with one or more other network elements, entities, terminals or the like. The I/O units 52 may be a combined unit comprising communication equipment towards several network elements, or may comprise a distributed structure with a plurality of different interfaces for different network elements. Reference sign 53 denotes a memory usable, for example, for storing data and programs to be executed by the processor 51 and/or as a working storage of the processor 51.

The processor 51 is configured to execute processing related to the above described aspects. In particular, the apparatus 50 may be implemented in or may be part of a network element, or the like, and may be configured to perform a method as described in connection with FIG. 4. Thus, the processor 51 is configured to perform receiving, at a network node, information regarding a suspected identifier problem from a first base station, the information indicating the suspected identifier problem between the first base station and a second base station, and analyzing the suspected identifier problem based on the received information.

For further details regarding the functions of the apparatus 5, reference is made to the description of the method according to example versions of the present invention as described in connection with FIG. 4.

Thus, in summary, PCI collision and confusion are very hidden problems. They lead to connection failures (radio link failures (RLF)/handover failures (HOF)), and the root cause is very difficult to detect. According to certain aspects of the present invention, a detailed analysis of information provided when RLF/HOF occurs by connection re-establishment attempts or after an RLF/HOF retrieved from RLF report can be analyzed in a way that PCI conflict suspicions can be derived without knowing the conflicting pair. Further, the invention proposes an exchange of information expressing the PCI conflict suspicion with other RAN nodes or with OAM entities where all relevant information can be combined to obtain an almost 100% reliable PCI conflict identification including an identification of the conflicting pair.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
receiving, at a network node and from a first base station, information of at least one suspected identifier problem for identifiers of cells used by terminals to connect to the cells, the information indicating the at least one suspected identifier problem between a cell of the first base station and a cell of a second base station, the information being based on a connection failure of a terminal;

analyzing, by the network node, the at least one suspected identifier problem based on the received information and a neighbor relation table associated with the second base station; and initiating, at the network node, over at least one interface appropriate actions based on at least the analysis of the at least one suspected identifier problem to resolve the at least one suspected identifier problem for the identifiers of the cells.

2. The method according to claim 1, wherein
the network node is a network management entity located in the operation and maintenance domain and the method comprises
collecting additional information on at least one suspected identifier problem from multiple other base stations; and
analyzing the at least one suspected identifier problem based on the additional information.

3. The method according to claim 1,
wherein the network node is a network management entity located in the operation and maintenance domain, the method further comprises:
analyzing the at least one suspected identifier problem based on a neighbor relation table associated with the second base station.

4. The method according to claim 1, wherein
the network node is the second base station and the method further comprises analyzing the at least one suspected identifier problem based on a neighbor relation table stored in the second base station.

5. The method according to claim 4, further comprising:
receiving the information at the first base station via at least one of an S1 interface or an X2 interface from the second base station.

6. The method according to claim 1, further comprising:
receiving the information at of the at least one suspected identifier problem at the network node from the first base station via at least one of an X2 interface or an S1 interface.

7. The method according to claim 1,
wherein the information of the at least one suspected identifier problem received by the network node is based on a counter of reports associated with suspected identifier problems of previous operations comprising at least one of a handover failure report, a radio link failure report, or a radio resource control connection re-establishment request, and
wherein the counter is forwarded to the network node with the information of the at least one suspected identifier problem for use by the network node to resolve the at least one suspected identifier problem for the identifiers of the cells.

8. The method according to claim 1, wherein
the information regarding the at least one suspected identifier problem is created at the second base station based on evaluating existing information in the second base station based on at least one of a radio link failure report or a re-establishment request.

9. The method according to claim 1, wherein
the identifier problem is a physical cell identifier confusion or a physical cell identifier collision.

10. The method of claim 1, wherein the identifiers for the cells are physical cell identifiers.

11. An apparatus, comprising: at least one processor, and at least one memory for storing instructions to be executed by the processor, wherein the at least one memory and the instructions are configured to, with the at least one processor, cause the apparatus at least to perform:

receiving at a network node from a first base station information regarding a of at least one suspected identifier problem for identifiers of cells used by terminals to connect to the cells, the information indicating the at least one suspected identifier problem between a cell of the first base station and a cell of a second base station, the information being based on a connection failure of a terminal;

analyzing, by the network node, the at least one suspected identifier problem based on the received information and a neighbor relation table associated with the second base station; and initiating, at the network node, over at least one interface appropriate actions in order based on at least the analysis of the at least one suspected identifier problem to resolve the at least one suspected identifier problem for the identifiers of the cells.

12. The apparatus according to claim 11, wherein
the network node is a network management entity located in the operation and maintenance domain and the at least one memory and the instructions are further configured to, with the at least one processor, cause the apparatus at least to perform:
collecting additional information on at least one suspected identifier problem from multiple other base stations; and
analyzing the at least one suspected identifier problem based on the additional information.

13. The apparatus according to claim 11, wherein
the network node is a network management entity located in the operation and maintenance domain and the at least one memory and the instructions are further configured to, with the at least one processor, cause the apparatus at least to perform:
analyzing the at least one suspected identifier problem based on a neighbor relation table associated with the second base station.

14. The apparatus according to claim 11, wherein
the network node is the second base station and the at least one memory and the instructions are further configured to, with the at least one processor, cause the apparatus at least to perform:
analyzing the at least one suspected identifier problem based on a neighbor relation table stored in the second base station.

15. The apparatus according to claim 14, wherein the at least one memory and the instructions are further configured to, with the at least one processor, cause the apparatus at least to perform:
receiving the information at the first base station via at least one of an S1 interface or an the X2 interface from the second base station.

16. The apparatus according to claim 14, wherein the at least one memory and the instructions are further configured to, with the at least one processor, cause the apparatus at least to perform:
receiving the information of the at least one suspected identifier problem at the network node from the first base station via at least one of an X2 interface or an S1 interface.

17. The apparatus according to claim 11,
wherein the information of the at least one suspected identifier problem received by the network node is based on a counter of reports associated with suspected identifier problems of previous operations comprising at least one of a handover failure report, a radio link failure report, or a radio resource control connection re-establishment request, and
wherein the counter is forwarded to the network node with the information of the at least one suspected identifier problem for use by the network node to resolve the at least one suspected identifier problem for the identifiers of the cells.

18. The apparatus according to claim 11, wherein
the information regarding the at least one suspected identifier problem is created at the second base station based on evaluating existing information in the second base station based on at least one of a radio link failure report or a re-establishment request.

19. The apparatus according to claim 11, wherein
the identifier problem is a physical cell identifier confusion or a physical cell identifier collision.

20. A computer program product including a non-transitory computer-readable medium comprising software code for performing the following, in response to the software code being run on a processing device: receiving, at a network node and from a first base station, information regarding a of a least one suspected identifier problem for identifiers of cells used by terminals to connect to the cells, the information indicating the at least one suspected identifier problem between a cell of the first base station and a cell of a second base station, the information being based on a connection failure of a terminal:
 analyzing, by the network node, the at least one suspected identifier problem based on the received information and a neighbor relation table associated with the second base station; and
 initiating, at the network node, over at least one interface appropriate actions—in order based on at least the analysis of the at least one suspected identifier problem to resolve the at least one suspected identifier problem for the identifiers of the cells.

* * * * *

UNITED STATES PATENT AND TRADEMARK OFFICE
CERTIFICATE OF CORRECTION

PATENT NO. : 10,433,190 B2
APPLICATION NO. : 15/500558
DATED : October 1, 2019
INVENTOR(S) : Bernhard Wegmann et al.

It is certified that error appears in the above-identified patent and that said Letters Patent is hereby corrected as shown below:

In the Claims

In Claim 6:
Column 11, Line 42, "at" should be deleted.

In Claim 11:
Column 12, Line 9, "regarding a" should be deleted.

In Claim 11:
Column 12, Line 21, "in order" should be deleted.

In Claim 20:
Column 14, Line 6, "regarding a" should be deleted.

In Claim 20:
Column 14, Line 6, "a least" should be deleted and --least-- should be inserted.

In Claim 20:
Column 14, Line 17, "- in order" should be deleted.

Signed and Sealed this
Nineteenth Day of November, 2019

Andrei Iancu
*Director of the United States Patent and Trademark Office*